UNITED STATES PATENT OFFICE.

ELSIE J. COMBS, OF PRATTSBURG, ASSIGNOR OF ONE-HALF HER RIGHT TO LEVI O. DUNNING, OF PENN YAN, NEW YORK.

IMPROVEMENT IN POLISHING COMPOUNDS.

Specification forming part of Letters Patent No. 144,444, dated November 11, 1873; application filed September 12, 1873.

*To all whom it may concern:*

Be it known that I, ELSIE J. COMBS, of Prattsburg, in the county of Steuben and State of New York, have invented a certain Compound called Cleaning and Polishing Compound, to be used for cleaning and polishing metals, glass, and other materials, of which the following is a specification:

To prepare the compound, take fifty pounds of soft carbonate of calcia, one and a half pound of hard soap, four ounces of aqua ammonia, one pint of alcohol, and water sufficient to make the mass of the consistency of dough. Dissolve the soap in the water, and add to the solution the ammonia and alcohol; then pour it into the calcia and mix the whole together; and then divide the mass into as many parts as desired, and mold or shape them into any form or shape required; then dry, so as to be readily handled and convenient for use.

I claim as my invention—

The compound for cleaning and polishing metals, glass, or other materials, compounded of the ingredients of soft carbonate of calcia, hard soap, aqua ammonia, alcohol, and water, in about the proportions named, and in the manner substantially as herein set forth.

ELSIE J. COMBS.

Witnesses:
    CHARLES F. GRENELL,
    JOHN L. LEWIS.